(12) United States Patent
Yaita et al.

(10) Patent No.: US 10,306,845 B1
(45) Date of Patent: Jun. 4, 2019

(54) FLOWER POT (71) Applicant: YAITA SEISAKUSHO CO., LTD., Kawaguchi-shi, Saitama (JP)

(72) Inventors: Shigeru Yaita, Kawaguchi (JP); Daisuke Yaita, Kawaguchi (JP); Kiyomi Nagoya, Sammu (JP)

(73) Assignee: YAITA SEISAKUSHO CO., LTD., Kawaguchi-shi, Saitama (JP)

( * ) Notice: Subject to any disclaimer, the term of this patent is extended or adjusted under 35 U.S.C. 154(b) by 2 days.

(21) Appl. No.: 15/823,589

(22) Filed: Nov. 28, 2017

(51) Int. Cl.
*A01G 27/02* (2006.01)
*A01G 27/04* (2006.01)
*A01G 9/02* (2018.01)
*A01G 24/00* (2018.01)

(52) U.S. Cl.
CPC ............ *A01G 27/04* (2013.01); *A01G 9/021* (2013.01); *A01G 24/00* (2018.02)

(58) Field of Classification Search
CPC .. A01G 27/003; A01G 27/006; A01G 27/008; A01G 27/02; A01G 27/04; A01G 27/06; A01G 9/02
See application file for complete search history.

(56) References Cited

U.S. PATENT DOCUMENTS

| | | | | |
|---|---|---|---|---|
| 5,477,640 A * | 12/1995 | Holtkamp, Jr. | ........ | A01G 27/04 239/289 |
| 6,134,833 A * | 10/2000 | Bachman | ........... | A01G 27/02 47/79 |
| 6,505,440 B1 * | 1/2003 | Lai | ........... | A01G 27/06 47/79 |
| 9,113,600 B2 * | 8/2015 | Wu | ........... | A01G 27/02 |
| 2007/0022660 A1 * | 2/2007 | Buitendag | ........... | A01G 27/06 47/81 |
| 2009/0223124 A1 * | 9/2009 | Pasquariello | ........... | A01G 27/04 47/66.1 |

FOREIGN PATENT DOCUMENTS

| | | |
|---|---|---|
| JP | H09-191770 A | 7/1997 |
| JP | 2004-065228 A | 3/2004 |
| JP | 2007-267655 A | 10/2007 |
| WO | 2007/114093 A | 10/2007 |

OTHER PUBLICATIONS

Extended European Search Report dated Jun. 8, 2018.

* cited by examiner

*Primary Examiner* — Trinh T Nguyen
(74) *Attorney, Agent, or Firm* — Yokoi & Co., U.S.A.; Toshiyuki Yokoi (57) ABSTRACT

Provided is a flower pot generating little root rot by controlling a water supply rate for a relatively long period of time even using a simple structure regardless of its size. The flower pot includes: an outer pot body; an inner pot body housed in the outer pot body with a gap as a water supply portion; a vertical position changeable member provided in a predetermined place to connect the outer pot body and the inner pot body; a flange provided on an upper end surface of the sidewall of the inner pot body; and a sealing portion formed of an elastic member and provided between the flange and the upper end surface of the sidewall of the outer pot body, in which water stored in the water supply portion is supplied to the inner pot body through a nonwoven fabric member.

6 Claims, 7 Drawing Sheets

FLOWER POT

TECHNICAL FIELD

The present invention relates to a flower pot (sometimes called as a plant pot or a planter etc.), and more particularly, to a flower pot generating little root rot by controlling a water supply rate (including a water supply amount, the same applies hereinafter) for a relatively long period of time even using a simple structure.

BACKGROUND ART

In the related art, as a flower pot, a double-layered flower pot 103 having an outer pot body 102 and an inner pot body 101 housed in the outer pot body 102 with a gap I has been proposed in order to reduce a watering effort taken for a long period of time and prevent root rot (see Patent Document 1).

Figure 7:
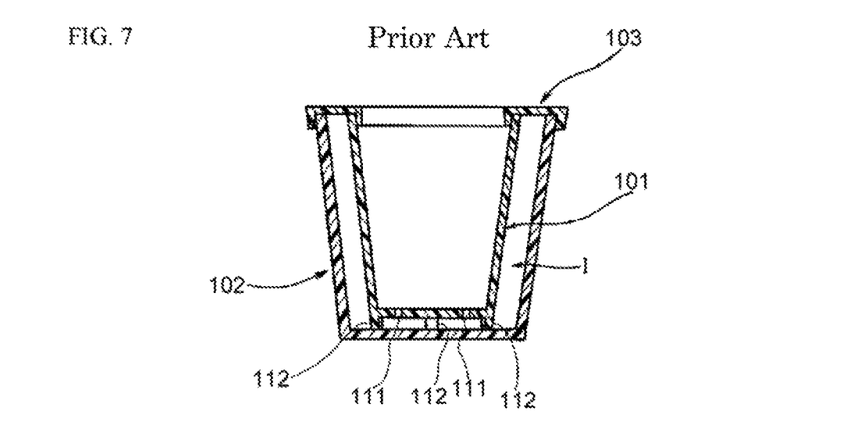
FIG. 7 is a diagram illustrating a flower pot (double-layered flower pot) of the related art.

More specifically, as illustrated in FIG. 7, the double-layered flower pot 103 has a bottom of the inner pot body 101 provided with a stand portion 112 extending downward and a plurality of water supply ports 111 having a diameter of 0.5 to 3 mm. The gap I between the inner pot body 101 and the outer pot bodies 102 serves as a water supply chamber, so that the water supplied to the water supply chamber is supplied to the inside of the inner pot body 101 through a plurality of water supply ports 111.

Similarly, a flower pot 201 (a wood block moisture adjustment device for preventing root rot in a flower pot plant) that supplies a proper amount of water to roots in the flower pot in order to prevent root rot has been proposed (see Patent Document 2).

Figure 8:
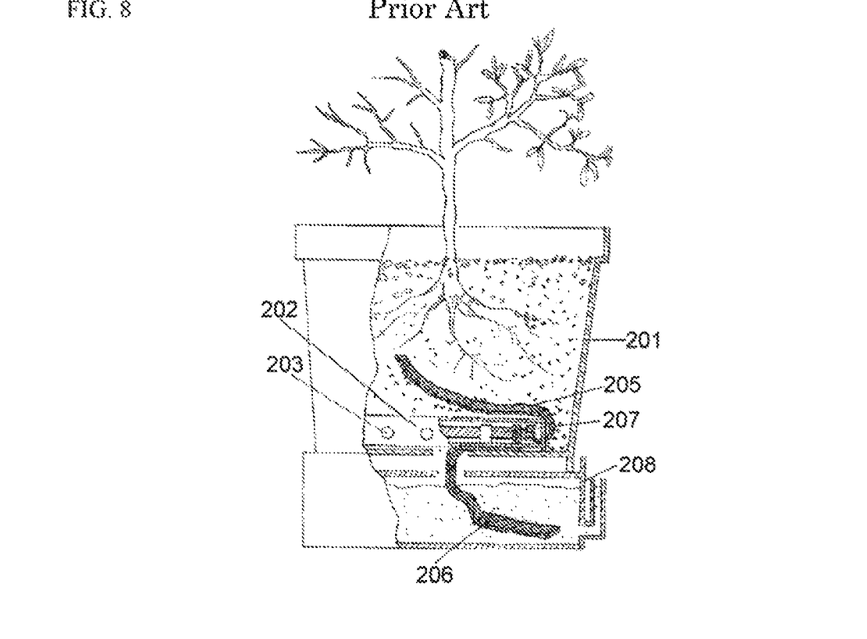
FIG. 8 is a diagram illustrating another flower pot of the related art.

More specifically, as illustrated in FIG. 8, the flower pot 201 has a bottom provided with a gouged wood block 207 and a plate spring 202, and a floating fiber tape 206 for supplying water on the basis of a capillary phenomenon is fixed to a tip of the plate spring 202.

When the wood block 207 becomes wet, it swells and presses the plate spring 202. Accordingly, the plate spring 202 presses the floating fiber tape 206 so that the supply of water stops.

CITATION LIST

Patent Document
  Patent Document 1: JP 9-191770 A (Claims)
  Patent Document 2: JP 2004-65228 A (Claims)

DISCLOSURE OF THE INVENTION

Problem to be Solved by the Invention

However, the double-layered flower pot discussed in Patent Document 1 does not have a sealing portion between the outer pot body and the inner pot body. Therefore, it is difficult to adjust an internal pressure of the water supply portion and further control the water supply rate.

For this reason, a significant amount of excessive water freely moves from the water supply portion to the inner pot body. Therefore, it is difficult to perfectly address the root rot problem disadvantageously.

The predetermined flower pot discussed in Patent Document 2 is based on a volume change generated by wetting and drying of the gouged wood block. However, it has a complicated structure. In addition, it is difficult to effectively use wetting and drying of such a predetermined wood block in practice.

Therefore, it is also difficult to accurately start or stop supplying of water in cooperation between the predetermined wood block and the plate spring in practice.

In this regard, the present inventors made diligent efforts to find a fact that the internal pressure of the water supply portion is adjusted, and further, the water supply rate can be controlled for a relatively long period of time, for example, for fifteen days, by providing a sealing portion between the outer pot body and the inner pot body even in a simple structure. As a result, this invention was obtained.

Specifically, an object of the invention is to provide a flower pot capable of generating little root rot by controlling the water supply rate for a relatively long period of time even using a simple structure.

Means for Solving Problem

According to the invention, the aforementioned problems can be addressed by providing a flower pot including: an outer pot body; an inner pot body housed in the outer pot body with a gap as a water supply portion; a folding portion provided on an upper end surface of a sidewall of the inner pot body; and a sealing portion formed of an elastic member and provided between the folding portion and an upper end surface of a sidewall of the outer pot body, in which water stored in the water supply portion is supplied to the inner pot body through a nonwoven fabric member.

That is, the folding portion is provided in a predetermined position between the outer pot body and the inner pot body, and the sealing portion having an elastic member mounted thereto is provided. Therefore, it is possible to provide a flower pot generating little root rot by controlling a supply rate on the basis of an internal pressure relationship over a long period of time even using a simple structure.

In addition, water stored in the water supply portion is supplied through a nonwoven fabric member inside the inner pot body on the basis of a capillary phenomenon or the like. Therefore, it is possible to control the water supply rate within a proper range over a longer period of time.

In the configuration of the flower pot according to the invention, it is preferable that the folding portion has an O-ring as the elastic member In this configuration, it is possible to control the sealing property of the sealing portion with high accuracy even using a simple structure.

Therefore, it is possible to control the water supply rate over a longer period of time and exhibit an automatic water supply function even using a simple structure in practice.

In the configuration of the flower pot according to the invention, it is preferable that a threaded portion is provided as a vertical position changeable member.

In this configuration, it is possible to adjust a height position of the inner pot body against the outer pot body just by changing a fastening state of the threaded portion.

Therefore, it is possible to precisely control the sealing property of the sealing portion with high accuracy even using a simple structure.

In the configuration of the flower pot according to the invention, it is preferable that a through-hole is provided in a bottom of the inner pot body, and a part of the nonwoven fabric member reaches the gap as the water supply portion through the through-hole.

In this configuration, it is possible to reliably control the water supply rate on the basis of a capillary phenomenon of the nonwoven fabric member.

In the configuration of the flower pot according to the invention, it is preferable that a flange is provided in the sidewall of the outer pot body.

In this configuration, it is possible to facilitate positioning of the inner pot body in the height direction by allowing the flange of the outer pot body to abut on the sidewall of the inner pot body.

Therefore, it is possible to precisely control the sealing property of the sealing portion with high accuracy even using a simple structure.

In the configuration of the flower pot according to the invention, it is preferable that any one of the outer pot body or the inner pot body is formed of at least one of polycyclohexane dimethylene terephthalate, an alcohol-modified product of polycyclohexane dimethylene terephthalate, or a glycol-modified product of polycyclohexane dimethylene terephthalate as a main component.

Using such limited materials, it is possible to improve hydrolysis resistance and transparency of the flower pot or laser weldability in a manufacturing process, compared to other polyester resins.

In particular, if transparency of such resin materials is generated, it is possible to visually and apparently observe a current water amount in the water supply portion. Therefore, it is possible to easily estimate a water supply time.

In the configuration of the flower pot according to the invention, it is preferable that a water supply metric scale is provided on a sidewall of the outer pot body or a sidewall of the inner pot body.

In this configuration, if the water supply metric scale is provided on any one or both of the sidewall of the outer pot body and the sidewall of the inner pot body, it is possible to prevent a leakage of the remaining water to the outside even when the water is charged before the inner pot body is fixedly placed in a predetermined position.

Since the current water amount of the water supply portion can be visually and apparently observed using such a metric scale, it is possible to easily estimate the next supply time.

In the configuration of the flower pot according to the invention, it is preferable that an innermost pot having a plurality of openings is provided inside the inner pot body, and a porous material is filled in the innermost pot.

In this configuration, the porous material is a light-weight material that is formed of, for example, clay, carbon, or the like, is fired at a temperature of 600 to 1,200° C., contains a lot of pores inside, and has a specific gravity of 0.2 to 0.8 g/cm³. Since the porous material itself has a water retention property or a fungicidal property at a predetermined level, it is helpful to growth of planted trees.

Since the porous material has a light weight, it does not hinder the capillary phenomenon of the nonwoven fabric member. In addition, since the planted trees can be easily transplanted by removing the porous material, cleaning of the flower pot or the like may be performed during the meantime.

In addition, since the porous material has a wide average particle diameter range of 1 to 18 mm, a porous material having an average particle diameter of 1 to 4 mm, a porous material having an average particle diameter of 5 to 8 mm, or a porous material having an average particle size of 10 to 18 mm is preferably employed separately or mixedly depending on a type or use purpose of the planted tree, or a type or size of the flower pot.

Note that a commercially available product such as HydroBall, CeramicCorn, Renton, or NeoCoal may be employed as such a porous material.

MODE(S) FOR CARRYING OUT THE INVENTION

First Embodiment

Figure 1:
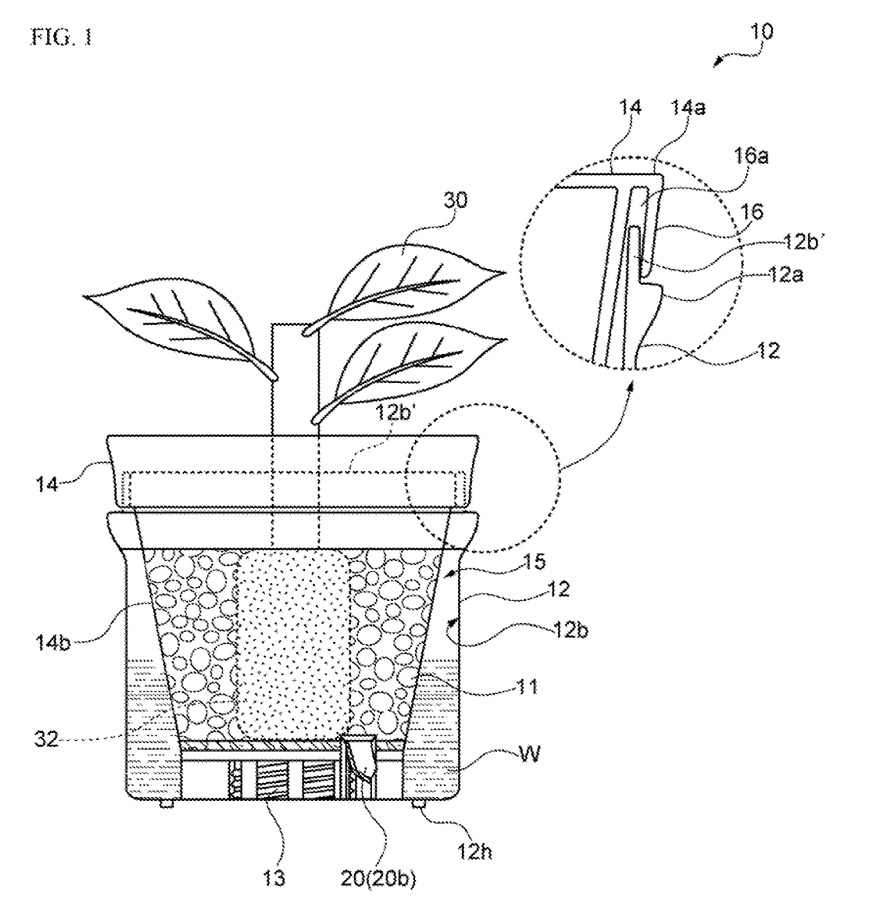
FIG. 1 is a diagram schematically illustrating a whole flower pot.

According to a first embodiment, as illustrated in FIG. 1, a flower pot 10 includes an outer pot body 12 and an inner pot body 14 housed in the outer pot body 12 with a gap as a water supply portion 15. An inner bottom surface of the outer pot body 12 and an outer bottom surface of the inner pot body 14 are connected to each other through a vertical position changeable member 13 (12d, 14d), and a folding portion 14a is provided on an upper end surface of a sidewall 14b of the inner pot body 14. A sealing portion 16 having an elastic member 16a is provided between the folding portion 14a and the upper end surface of the sidewall 12b of the outer pot body 12. Meanwhile, the water stored in the water supply portion 15 is supplied to the inside of the inner pot body 14 through a nonwoven fabric member 20.

1. Outer Pot Body

Figure 2A:
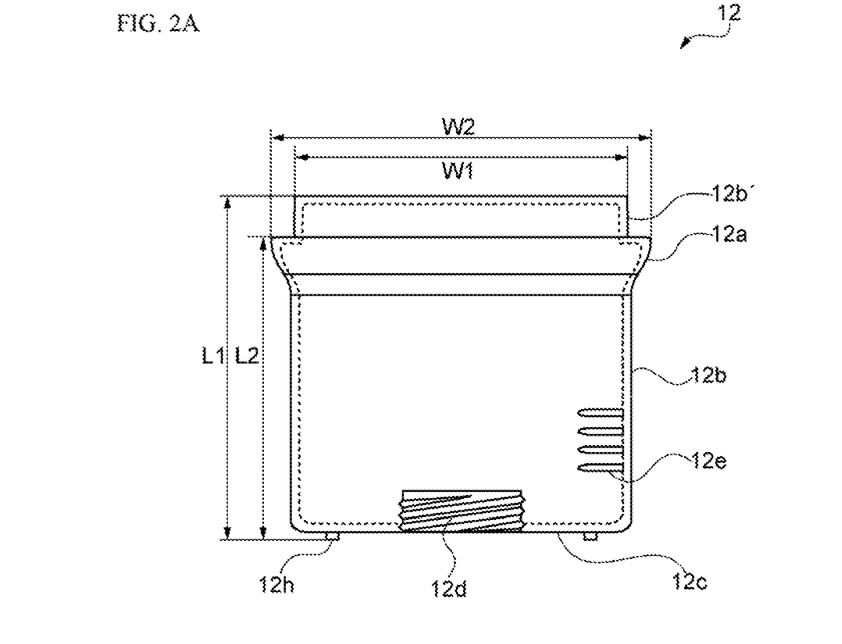
FIGS. 2A to 2B are a side view and a plan view, respectively, illustrating an outer pot body of the flower pot of FIG. 1.
Figure 2B:
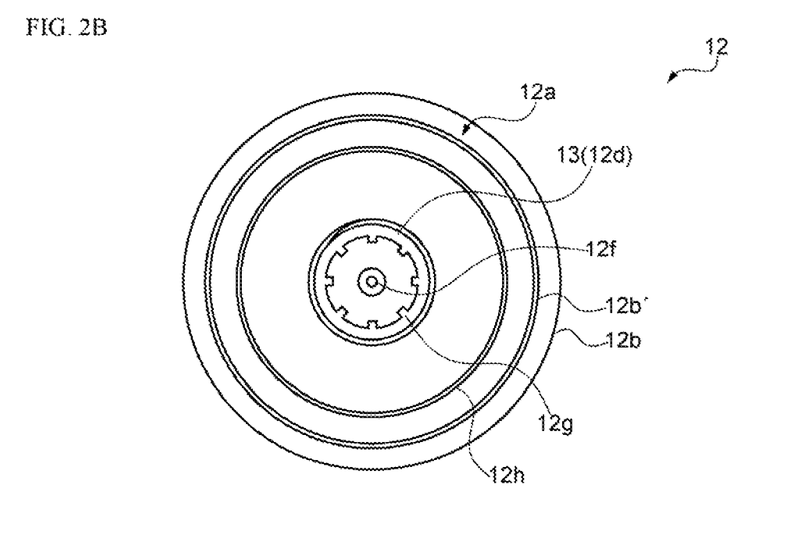

A shape of the outer pot body 12 of the flower pot 10 is, for example, but not particularly limited to, a basically cylindrical shape provided with a bottom 12c as illustrated in FIG. 2. For example, when a truncated conical inner pot body 14 is fixed inside, a gap is formed between the outer pot body 12 and the inner pot body 14, and this gap preferably serves as a water supply portion 15.

Therefore, the outer pot body 12 illustrated in FIG. 2 has a height L1 extending from the bottom 12c to an upper end surface of a sidewall 12b' inserted into the elastic member (sealing member) 16a of the sealing portion 16. Typically, the height L1 of the outer pot body 12 is preferably set to 3.5 to 12.5 cm, and more preferably 4.5 to 8.5 cm.

The outer pot body 12 has a height L2 extending from the bottom 12c to the upper end surface of the flange 12a. Typically, the height L2 of the outer pot body 12 is preferably set to 3 to 12 cm, and more preferably 4 to 8 cm.

As illustrated in FIG. 2, a flange (protrusion) 12a is preferably provided along the sidewall 12b of the outer pot body 12.

In this configuration, the flange horizontally protruding in the outer pot body and the sidewall of the inner pot body abut on each other, so that it is possible to facilitate positioning of the inner pot body in the height direction.

That is, since a lower surface of the flange of the outer pot body reliably abuts on the end surface of the sidewall of the inner pot body with a predetermined area, it is possible to precisely control a sealing property of the sealing portion with high accuracy.

Therefore, with regard to the shape of the outer pot body 12 illustrated in FIG. 2, typically, an opening provided in the upper portion preferably has a diameter W1 of 3 to 12 cm, more preferably 4 to 10 cm, and most preferably 5 to 8 cm.

Typically, an outer diameter W2 including the flange 12a is preferably set to be larger than the diameter W1 of the opening by 0.3 to 4 cm, more preferably by 0.5 to 2 cm, and most preferably by 1 to 1.5 cm.

Note that, although the shape of the flange is not particularly limited, for example, the flange preferably has an annular shape (ring shape) having a thickness of 0.1 to 3 mm formed continuously or intermittently along the sidewall of the outer pot body.

2. Inner Pot Body (1) Shape

Figure 3A:
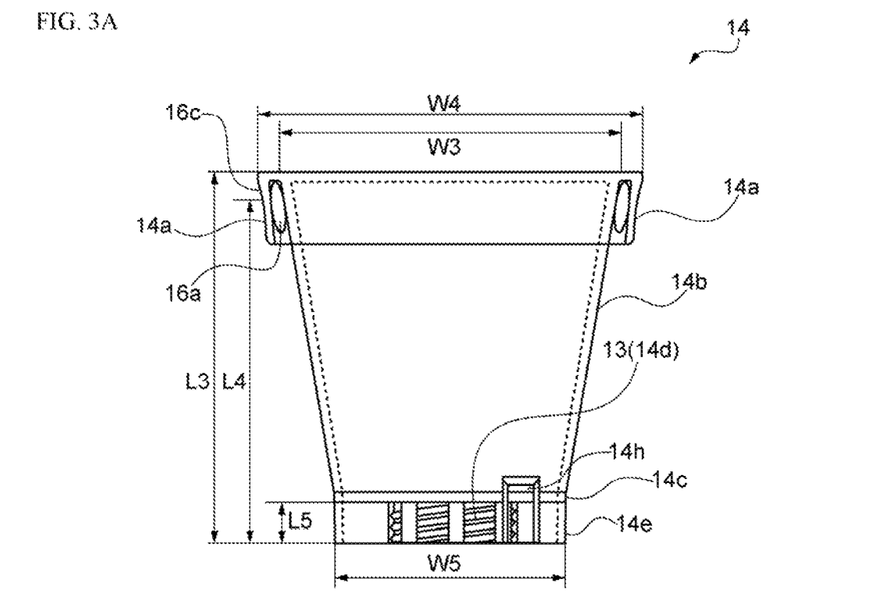
FIGS. 3A to 3B are a side view and a plan view, respectively, illustrating in inner pot body of the flower pot of FIG. 1.
Figure 3B:
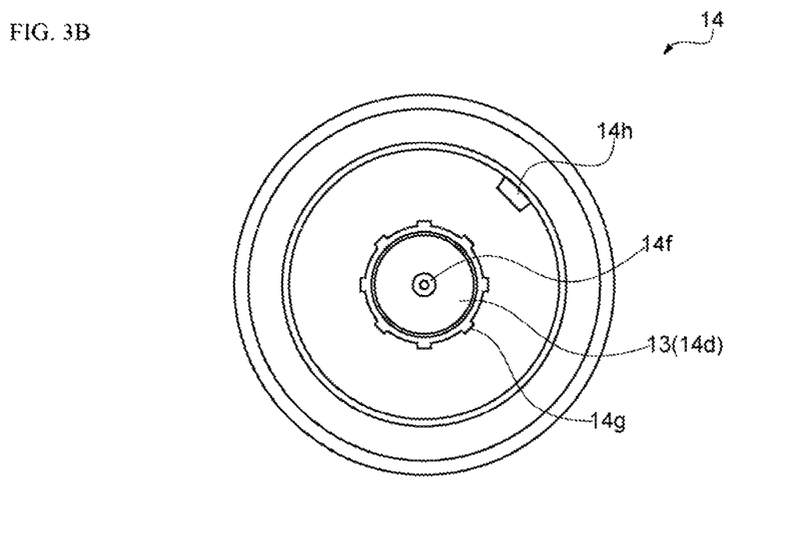

Although the shape of the inner pot body 14 of the flower pot 10 is not particularly limited, basically, the inner pot body 14 has a cylindrical shape smaller than the outer pot body 12 as illustrated in FIG. 3 so as to be fixedly arranged inside the outer pot body 12. Meanwhile, a gap is preferably formed therebetween to serve as a water supply portion 15 for storing water W and slowly supplying water.

With regard to the shape of the inner pot body 14, a folding portion 14a is provided in the upper end surface of its sidewall 12b', and a sealing portion 16 including the elastic member 16a described below is provided between the folding portion 14a and the upper end surface of the sidewall 12b of the outer pot body 12.

Therefore, since the sealing portion 16 having the folding portion 14a and the elastic member 16a mounted inside the folding portion 14a is provided in a predetermined position between the outer pot body 12 and the inner pot body 14 as illustrated in FIG. 1, the elastic member 16a abuts on the upper end surface of the sidewall 12b of the outer pot body 12 and the like. In addition, a part of the sidewall 12b is inserted into the elastic member 16a to exhibit a predetermined sealing property.

That is, even using such a simple structure, the sealing portion 16 adjusts an internal pressure (negative pressure) of the water supply portion 15 over a relatively long period of time, for example, for 15 days or longer, and a proper amount of water is slowly supplied by controlling the water supply rate on the basis of this relationship. Therefore, it is possible to suppress occurrence of root rot.

With regard to the shape of the inner pot body 14 illustrated in FIG. 3, its height L3 includes a height of the folding portion 14a and the like. However, the inner pot body 14 preferably has a height L3 of, for example, 3.5 to 12.5 cm, and more preferably 4.5 to 8.5 cm.

A height L4 of the inner pot body 14 corresponds to a value obtained by removing its thickness (approximately 1 mm) from the height L1 of the outer pot body 12 of FIG. 2. For example, the height L4 of the inner pot body 14 is preferably set to 3 to 12 cm, and more preferably 4 to 8 cm.

With regard to the shape of the inner pot body 14 of FIG. 3, the inner pot body 14 has a tapered shape having a diameter increasing from a stand portion 14e provided in the backside of the bottom surface 14c as a vertical end surface in a cylindrical shape or the like toward the folding portion 14a provided in the upper side.

More specifically, an angle between the vertical direction and the sidewall of the inner pot body 14 is preferably set to 2 to 45°, more preferably 5 to 30°, and most preferably 10 to 20°.

Therefore, typically, the bottom surface 14c preferably has a diameter W5 of 2 to 8 cm, more preferably 3 to 7 cm, and most preferably 4 to 6 cm.

Typically, the inner diameter (opening inner diameter) W3 of the folding portion 14a is preferably set to be larger than the diameter W5 of the bottom surface 14c by 0.3 to 4 cm, more preferably by 0.8 to 3 cm, and most preferably by 1.2 to 2.5 cm.

Considering the size of the sealing portion, typically, the outer diameter (opening outer diameter, W4) of the folding portion 14a is set to be larger than the inner diameter (opening inner diameter, W3) of the folding portion 14a, preferably by 0.2 to 3 cm, more preferably by 0.5 to 2 cm, and most preferably by 0.8 to 1.5 cm.

In addition, the height L5 of the stand portion 14e provided in the backside of the bottom surface 14c in a cylindrical shape or the like affects the size of the water feeding hole 14h and installability or fixability of the elastic member 16a. However, typically, the height L5 of the stand portion 14e is preferably set to 0.2 to 3 cm, and more preferably 0.3 to 2 cm.

(2) Innermost Pot

Figure 6A:
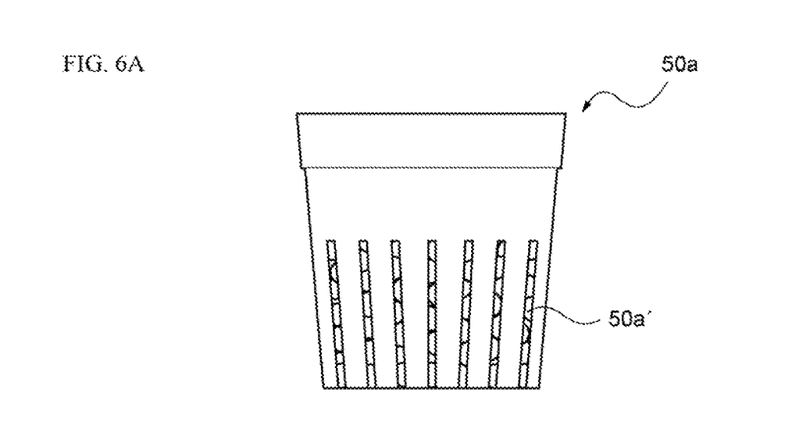
FIGS. 6A to 6C are diagrams illustrating elements (including the innermost pot, the inner pot body, and the outer pot body) of the flower pot of FIG. 5.

An innermost pot 50a nearly directly making contact with a plant 30 planted in the flower pot 10 may also be provided as an accessory of the inner pot body 14 inside the inner pot body 14 as illustrated in FIG. 6A in order to facilitate an transplanting work or the like.

More specifically, such an innermost pot 50a is a cup-like object housed in the inner pot body and is preferably an olefin resin cup provided with, for example, one to thirty slits 50a' (having a width of 0.1 to 5 mm and a length of 0.5 to 3 cm) depending on a size of the innermost pot.

3. Sealing Portion

In the sealing portion 16 of the flower pot 10, the folding portion 14a is provided on the upper end surface of the sidewall 14b of the inner pot body 14, and the elastic member 16a is fixedly arranged between the folding portion 14a and the upper end surface of the sidewall 12b' of the outer pot body 12 as illustrated in FIG. 1.

That is, the sealing portion 16 having the folding portion 14a and the elastic member 16a for controlling the internal pressure of the water supply portion 15 and the water supply rate is provided in a predetermined position between the outer pot body 12 and the inner pot body 14.

Therefore, even using a simple structure, it is possible to provide a flower pot generating little root rot by controlling the water supply rate on the basis of a relationship of the internal pressure (negative pressure) of the water supply portion over a long period of time.

The sealing portion is preferably formed by placing an O-ring or plate-shaped rubber as the elastic member in the folding portion provided in one end of the inner pot body.

In this configuration, it is possible to allow the sealing portion to exhibit an excellent sealing property and control the water supply rate over a longer period of time even using a simple structure.

Note that, in order to pressedly install the sealing portion in the gap of the folding portion, the O-ring or plate-shaped rubber preferably has a cross-sectional diameter (or thickness) of 0.2 to 5 mm, and more preferably 0.5 to 3 mm.

Although a type of the elastic member included in a part of the sealing portion is not particularly limited, the elastic member may be formed of, for example, one or a combination of silicon rubber, olefin rubber, styrene rubber, natural rubber, chloroprene rubber, butyl rubber, polyvinyl chloride rubber, acrylic rubber, urethane rubber, or fluororubber.

In particular, the silicon rubber is preferable because it easily provides excellent durability, water repellency, and the like as well as an excellent sealing property. The olefin rubber is preferable because it easily provides excellent water resistance, water repellency, and the like with relatively low cost.

4. Vertical Position Changeable Member

As illustrated in FIG. 2, the vertical position changeable member 13 of the flower pot 10 preferably has, for example, a threaded portion including a male threaded portion 12d and a female threaded portion 14d or a nested structure having a pair of tapered shapes.

Using such a threaded portion or the like, it is possible to adjust a height position of the inner pot body inside the outer pot body to a desired position with high accuracy just by changing a fastened state of the threaded portion.

By providing the vertical position changeable member in the center of the bottom surface of the inner pot body, it is possible to easily set a fixing position of the inner pot body inside the outer pot body and adjust the width of the gap serving as the water supply portion with high accuracy.

More specifically, as illustrated in FIG. 2 or 3, by providing guiding members 12g and 14g in the vertical position changeable member 13 positioned in the center 12f and 14f, it is possible to more accurately set the fixing position of the inner pot body 14 inside the outer pot body 12 and improve a sealing property of the sealing portion advantageously.

Therefore, if the vertical position changeable member 13 is the threaded portion as illustrated in FIG. 2 or 3, it is possible to improve a mechanical strength or dimensional stability of the threaded portion as the vertical position changeable member 13 by providing the guide member 12g having a male thread and the guide member 14g having a female thread in the outer side of the male thread and the inner side of the female thread, respectively.

Furthermore, if such a vertical position changeable member (threaded portion) 13 is provided, it is possible to simultaneously form the outer pot body and the inner pot body through an injection molding or the like, which is advantageous in terms of manufacturing.

Therefore, if the vertical position changeable member is such a threaded portion, it is possible to precisely control the sealing property of the sealing portion even using a simple structure.

Accordingly, using a predetermined vertical position changeable member, it is possible to omit watering or prevent root rot over a long period of time by controlling the water supply rate within a proper range.

In addition, as an aspect in which a separate vertical position changeable member is combined as described in the second embodiment, a threaded portion may be preferably provided between the outer pot body and the inner pot body around (under) the sealing portion.

By providing a plurality of vertical position changeable members in the vertical direction, it is possible to more reliably fasten the outer pot body and the inner pot body and improve the sealing property of the sealing portion while variably setting a relative distance between the outer pot body and the inner pot body.

5. Nonwoven Fabric Member

As illustrated in FIG. 1, the nonwoven fabric member 20 of the flower pot 10 is a portion for slowly supplying the water stored in the water supply portion 15 as a gap between the outer pot body 12 and the inner pot body 14 to the inside of the inner pot body 14 through the water feeding hole 14h provided in the lower side of the inner pot body 14 on the basis of a capillary phenomenon or the like.

That is, it is possible to control the water supply rate within a proper range over a longer period of time by supplying the water stored in the water supply portion 15 to the inside of the inner pot body 14 through the nonwoven fabric member 20 (20a and 20b) partially protruding to the water feeding hole 14h.

Figure 4A:
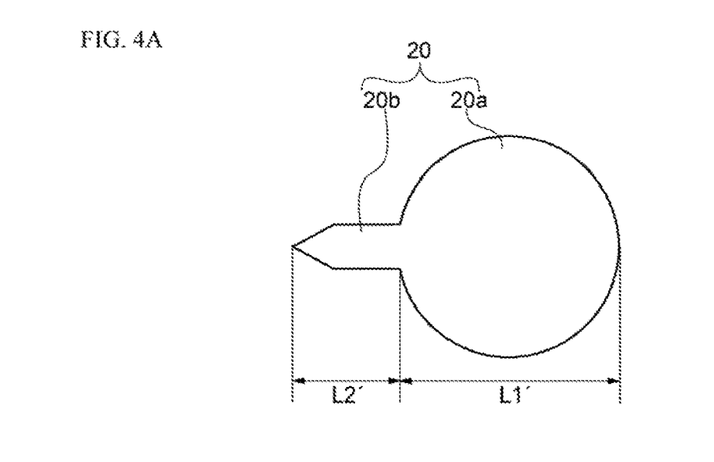
FIG. 4A is a plan view illustrating a nonwoven fabric member.
Figure 4B:
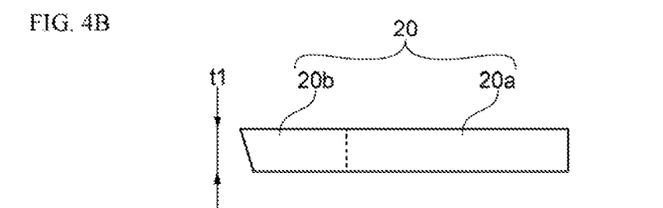
FIG. 4B is a side view illustrating the nonwoven fabric member.

Although the shape of the nonwoven fabric member 20 depends on the shape or size of the flower pot, the type of the planted tree, and the like, for example, as illustrated in FIGS. 4A and 4B, a planar shape of the nonwoven fabric member 20 is nearly circular, and a cross-sectional shape is a planar shape having nearly the same thickness t1.

More specifically, typically, a circular portion 20a of the nonwoven fabric member 20 preferably has a diameter L1' of 2 to 8 cm, more preferably 3 to 7 cm, and most preferably 4 to 6 cm.

In addition, typically, the length L2' of the protruding portion 20b of the nonwoven fabric member 20 is preferably set to 0.1 to 5 cm, more preferably 0.3 to 3 cm, and most preferably 0.5 to 2 cm.

Note that the nonwoven fabric member may be formed of, but not particularly limited to, for example, one or a combination of fiber materials including olefin fiber, acrylic fiber, polyester fiber, urethane fiber, cellulose acetate fiber, polyamide fiber, polyimide fiber, silk, and cotton, or the like.

Black fungi or the like are easily generated in the nonwoven fabric member in some cases. Therefore, a predetermined amount of antibacterial agent or antifungal agent is preferably mixed with the aforementioned materials.

More specifically, a mixing amount of the antibacterial agent or the like is preferably set to 0.1 to 10% by weight against a total amount of the nonwoven fabric member, more preferably 0.5 to 5% by weight, and most preferably 1 to 3% by weight.

6. Water Supply Portion

As illustrated in FIG. 1, the water supply portion 15 is a gap formed by a sidewall (inner wall) 12b of the outer pot body 12 and a sidewall (outer wall) 14b of the inner pot body 14 to store a predetermined amount of water.

Therefore, depending on the size or use purpose of the flower pot, such a gap preferably has a width of 0.5 to 30 mm, more preferably 1 to 20 mm, and most preferably 3 to 15 mm.

In order to improve the sealing property between the outer pot body 12 and the inner pot body 14 or insertion easiness of the inner pot body 14 into the inside of the outer pot body 12, the cross-sectional shape of the water supply portion 15 is preferably a tapered shape as seen from the opening of the vertical cross section of the flower pot 10 as illustrated in FIG. 1.

7. Materials (1) Outer Pot Body

The transparent polyester resin of the outer pot body 12 is preferably formed of a predetermined polyester resin as a main component.

Here, the predetermined polyester resin preferably includes one or a combination of polycyclohexane dimethylene terephthalate (PCT), an alcohol-modified product of polycyclohexane dimethylene terephthalate (PCTA), a glycol-modified product of polycyclohexane dimethylene terephthalate (PCTG), or the like.

The reason for this is that polyester resin having such a cyclo-ring structure is superior in hydrolysis resistance, transparency, and colorability, as compared with other polyester resins.

Using such a polyester resin, it is possible to provide a lid portion having excellent transparency and high quality even when a non-carbon black type black pigment is mixed as a colorant.

Furthermore, using such a polyester resin, it is possible to remarkably improve a mechanical strength, durability, and the like.

Note that the PCT is a polyester resin in which thermal crystallization is suppressed by reacting a dicarboxylic acid containing terephthalic acid as a main component and a diol component containing 1,4-cyclohexanedimethanol (CHDM) as a main component. A commercially available product of the PCT is Surmix produced by Eastman Chemical Company or the like.

The PCTA is a polyester resin in which thermal crystallization is suppressed by reacting a dicarboxylic acid containing a terephthalic acid and an isophthalic acid as a main component and a diol component containing 1,4-cyclohexanedimethanol (CHDM) as a main component. A commercially available product of the PCTA is Eastar AN014 or AN004 produced by Eastman Chemical Company or the like.

The PCTG is a polyester resin in which thermal crystallization is suppressed by reacting a dicarboxylic acid containing a terephthalic acid as a main component, 1,4-cyclohexanedimethanol (CHDM), and a diol component containing ethylene glycol as a main component. A commercially available product of the PCTG is Eastar DN011 or DN004 produced by Eastman Chemical Company, or the like.

Although the transparent polyester resin is basically transparent, the transparent polyester resin preferably has a predetermined visible light transmittance by appropriately adjusting the type or the mixing amount of the colorant in order to provide a high quality.

Therefore, the visible light transmittance (a value measured according to the standard JIS R3212, for example, at a wavelength of 500 nm) is preferably 70% or higher, more preferably 80 to 99.9%, and most preferably 90 to 99%.

Various additives may be mixed with the transparent polyester resin as long as a predetermined visible light transmittance can be maintained.

More specifically, such additives include one or a combination of an ultraviolet absorber, an aging inhibitor, a dehydrating agent, a filler, a conductive material, a thermally conductive material, a plasticizer, an anhydrous silica, an amide wax, isoparaffin, a flame retardant, a functional oligomer, a coupling agent, an antibacterial agent, an antifungal agent, or the like.

If these additives are added, depending on the type of additive, a mixing amount thereof is preferably set to 0.01 to 20 parts by weight against 100 parts by weight of the polyester resin, more preferably 0.05 to 8 parts by weight, and most preferably 0.1 to 1 part by weight.

Furthermore, these additives are preferable because it is possible to improve laser weldability, hydrolysis resistance, and the like by mixing a predetermined amount of an ultraviolet absorber such as 2-[2-hydroxy-3,5-bis(α,α-dimethylbenzyl)phenyl]-2H-benzotriazole or the like.

(2) Inner Pot Body

The inner pot body may be formed of a material other than that of the outer pot body. However, similar to the outer pot body, the inner pot body is preferably formed of one or a combination of polycyclohexane dimethylene terephthalate (PCT), an alcohol modified product of polycyclohexane dimethylene terephthalate (PCTA), and a glycol modified product of polycyclohexane dimethylene terephthalate (PCTG) due to excellent hydrolysis resistance and transparency.

(3) Innermost Pot

The innermost pot is preferably formed of, but not particularly limited to, an olefin resin such as a polyethylene resin and a polypropylene resin due to low cost and light weight.

Furthermore, a predetermined amount of the colorant, for example, 0.01 to 10% by weight against a total amount may be preferably mixed with the olefin resin such as a polyethylene resin or a polypropylene resin for colorization or transparent colorization.

8. How to Use

The flower pot according to the first embodiment is preferably used, but not particularly limited to, in the following procedure.

(1) A plurality of porous materials were filled in the polyethylene innermost pot having a predetermined volume (slits having a predetermined width and a predetermined length).

(2) Then, a foliage plant having a predetermined height was transplanted to a gap of the plurality of porous materials filled in the innermost pot.

(3) Then, a polyethylene nonwoven fabric member having a circular shape with a predetermined thickness and a predetermined diameter was housed in the bottom of the inner pot body having a predetermined volume and having a water access hole near the bottom.

(4) Then, the innermost pot transplanted with a foliage plant was housed in the inner pot body provided with a polyethylene nonwoven fabric member.

(5) Then, water was charged with reference to an internal metric scale of the outer pot body having a predetermined volume.

(6) Then, the inner pot body transplanted with a foliage plant or the like was housed in the outer pot charged with water.

(7) Finally, a height of the inner pot body inside the outer pot body was adjusted, and the sealing property of the sealing portion mounted with the elastic member (O-ring) was adjusted by fastening the threaded portion provided between the outer pot body and the inner pot body, so that a small foliage plant was obtained.

(8) Then, a supply rate was measured per twelve hours. If the supply rate is excessively higher than a predetermined value, the sealing property of the sealing portion was adjusted, and the supply rate was set to a predetermined range (for example, 20 mm$^3$/15 days) by further fastening the threaded portion provided between the outer pot body and the inner pot body, so that a small foliage plant was obtained.

Second Embodiment

Figure 5:
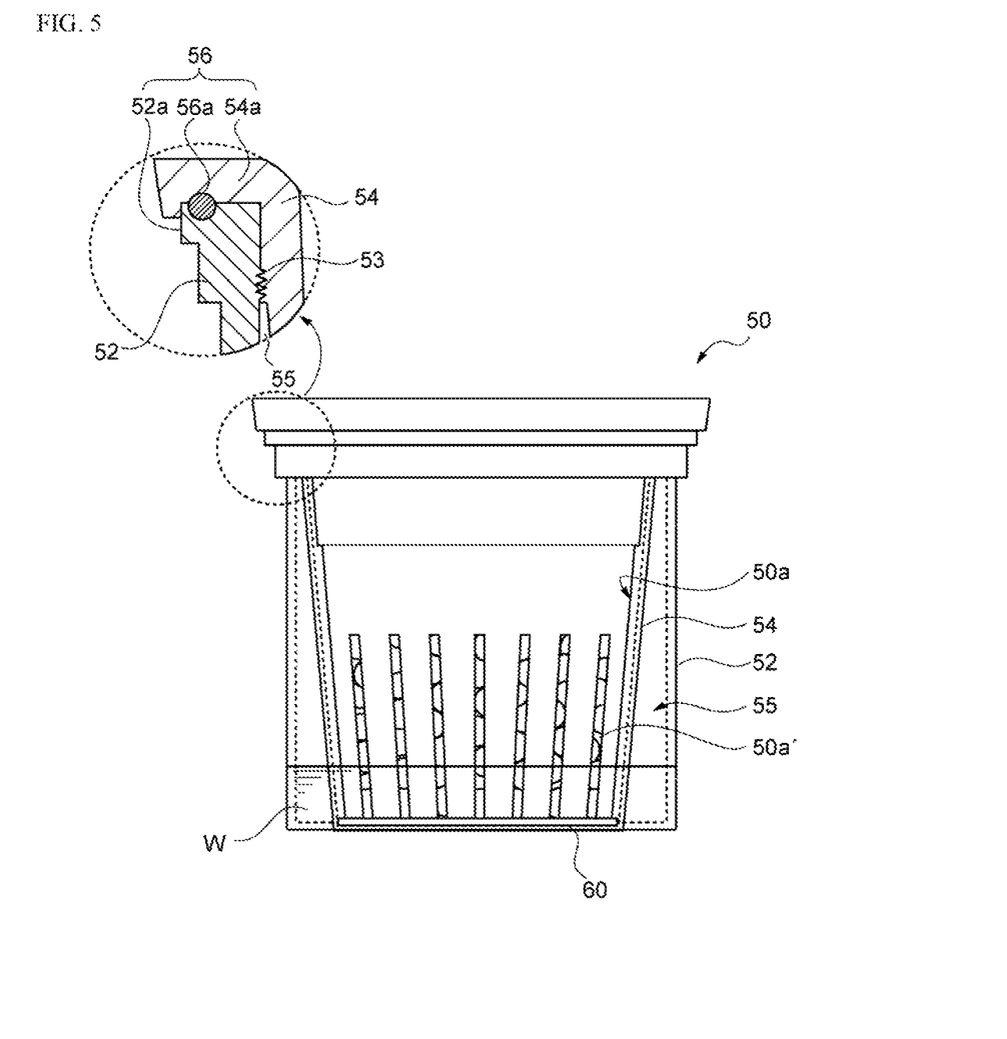
FIG. 5 is a diagram illustrating another configuration of the flower pot.

As illustrated in FIG. 5, according to the second embodiment, there is provided a flower pot 50 including an outer pot body 52, an inner pot body 54 housed in the outer pot body 52 with a gap as a water supply portion 55, a flange 52a provided on an upper end surface of the sidewall of the inner pot body 54, a sealing portion 56 having an elastic member 56a provided between the flange 52a and the upper end surface of the sidewall of the outer pot body 52, and a vertical position changeable member 53 provided in a lower side of the sealing portion 56. Meanwhile, the water W stored in the water supply portion 55 is supplied to the inside of the inner pot body 54 through a nonwoven fabric member 60.

The flower pot according to the second embodiment will now be described specifically by focusing on differences from the first embodiment (such as the vertical position changeable member).

1. Outer Pot Body

The outer pot body 52 of the flower pot 50 according to the second embodiment is similar to that of the flower pot 10 of the first embodiment.

However, in the case of the flower pot 10 according to the first embodiment, the inner bottom surface of the outer pot body 12 and the outer bottom surface of the inner pot body 14 are connected to each other through the vertical position changeable member 13. Therefore, the female threaded portion 14d as a part of the vertical position changeable member 13 is provided on the inner bottom surface of the outer pot body 12.

In comparison, in the case of the flower pot 50 according to the second embodiment, as illustrated in FIG. 5, a threaded portion as the vertical position changeable member 53 is provided in the lower side of the sealing portion 56.

Therefore, the flower pot 50 according to the second embodiment is different from the flower pot 10 of the first embodiment in that, as illustrated in FIG. 5, the threaded portion as the vertical position changeable member 53 is provided in a predetermined place, and a male threaded portion (or female threaded portion) is provided in the sidewall of the outer pot body 52.

2. Inner Pot Body

The inner pot body 54 of the flower pot 50 according to the second embodiment has a shape similar to that of the flower pot 10 of the first embodiment.

However, as described above, in the case of the flower pot 10 of the first embodiment, the inner bottom surface of the outer pot body 12 and the outer bottom surface of the inner pot body 14 are connected to each other through the vertical position changeable member 13. Therefore, the male threaded portion 12d as a part of the vertical position changeable member 13 is provided on the outer bottom surface of the inner pot body 14.

In comparison, in the case of the flower pot 50 according to the second embodiment, as illustrated in FIG. 5, the vertical position changeable member 53 is provided in the lower side of the sealing portion 56.

Therefore, the flower pot 50 according to the second embodiment is different from the flower pot 10 of the first embodiment in that, as illustrated in FIG. 5, the threaded portion as the vertical position changeable member 53 is provided in a predetermined place, and the female threaded portion (or male threaded portion) is provided on the sidewall of the inner pot body 54.

3. Sealing Portion

The sealing portion 56 of the flower pot 50 according to the second embodiment has a shape similar to that of the flower pot 10 of the first embodiment, and it will not be described repeatedly.

4. Nonwoven Fabric Member

The nonwoven fabric member 60 of the flower pot 50 according to the second embodiment also has a shape similar to that of the flower pot 10 of the first embodiment, and it will not be described repeatedly.

5. Water Supply Portion

The water supply portion 55 for storing water and supplying water by a predetermined amount in the flower pot 50 according to the second embodiment also has a shape similar to that of the flower pot 10 of the first embodiment, and it will not be described repeatedly.

6. Vertical Position Changeable Member

The flower pot 50 according to the second embodiment is characterized in that the vertical position changeable member (such as the threaded portion) for adjusting the sealing property described in the first embodiment is provided in the lower side of the sealing portion 56 as illustrated in FIG. 5.

Figure 6B:
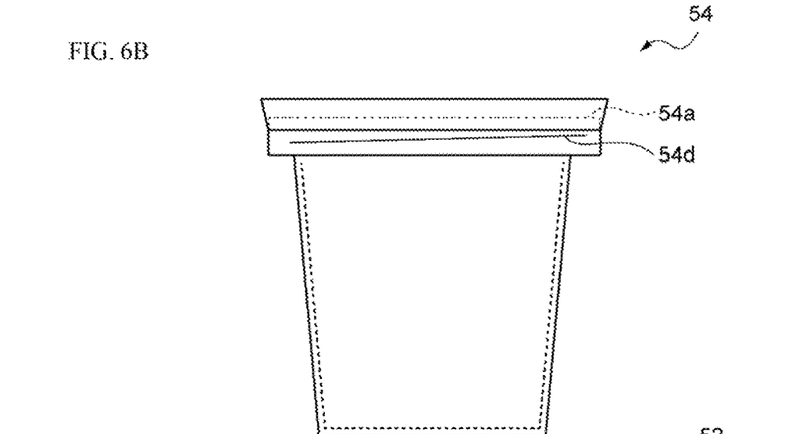
Figure 6C:
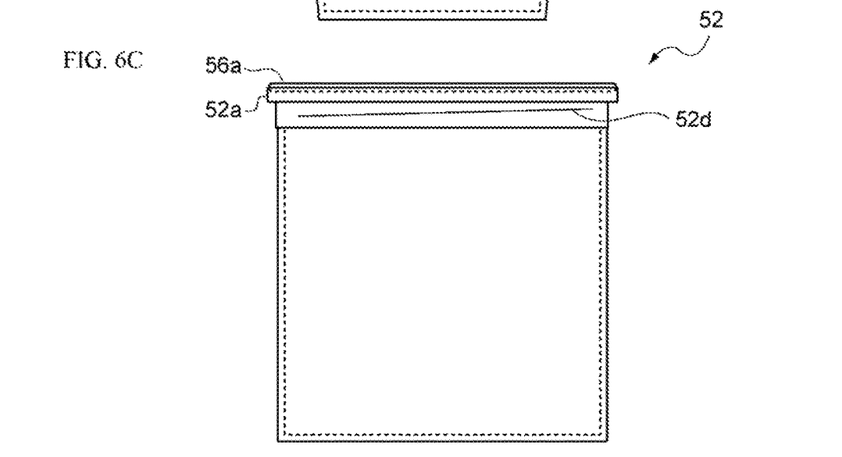

That is, the sealing portion 56 may be formed by providing the male threaded portion 54d as a part of the vertical position changeable member in the inner pot body 54 as illustrated in FIG. 6B and providing the female threaded portion 52d as a part of the vertical position changeable member in the outer pot body 52 as illustrated in FIG. 6C.

The sealing portion may be formed by providing the female threaded portion as a part of the vertical position changeable member in the inner pot body and providing the male threaded portion as a part of the vertical position changeable member in the outer pot body.

In any case, the outer pot body 52 and the inner pot body 54 can be fastened by forming the predetermined sealing portion 56, and the internal pressure of the water supply portion 55 for storing water W can be adjusted by variably setting a relative distance between the outer pot body 52 and the inner pot body 54.

Therefore, in this configuration, it is possible to exhibit an excellent sealing property with high accuracy using a simple structure and control the water supply rate over a longer period of time.

7. Materials

In the flower pot 50 according to the second embodiment, materials of the outer pot body and the inner pot body are similar to those of the flower pot of the first embodiment, and preferably include one or a combination of polycyclohexane dimethylene terephthalate (PCT), an alcohol-modified product of polycyclohexane dimethylene terephthalate (PCTA), a glycol-modified product of polycyclohexane dimethylene terephthalate (PCTG), and the like.

The material of the innermost pot according to the second embodiment is also similar to that of the flower pot of the first embodiment and preferably includes an olefin resin or the like.

8. How to Use

Similarly, the flower pot according to the second embodiment is preferably used, but not particularly limited to, in the following procedure.

(1) An inner pot body having a water access hole in the vicinity of the bottom of the inner pot body formed of a PCTA resin with a predetermined volume was prepared.

(2) Then, a nonwoven fabric member having a predetermined thickness and a predetermined diameter was housed in the bottom of the inner pot body.

(3) Then, the innermost pot of FIG. 6A was prepared, and a porous material having a predetermined average particle diameter was filled therein. In addition, a foliage plant having a predetermined height was inserted.

(4) Then, the foliage plant was placed on the nonwoven fabric member inside the inner pot body while being inserted into the innermost pot of FIG. 6A.

(5) Then, a predetermined amount of water was charged in the outer pot body with reference to an internal metric scale of the outer pot body formed of a PCTA resin with a predetermined volume.

(6) Then, the inner pot body including the foliage plant inserted into the innermost pot was housed in the outer pot body charged with water.

(7) Then, a height of the inner pot body inside the outer pot body was adjusted and the sealing property of the sealing portion mounted with the elastic member (O-ring) was adjusted by fastening the threaded portion provided between the outer pot body and the inner pot body in the lower side of the sealing portion, so that a small foliage plant was obtained.

(8) Then, a supply rate was measured per twelve hours. If the supply rate is excessively higher than a predetermined value, the sealing property of the sealing portion was adjusted, and the supply rate was set to a predetermined range (for example, 20 mm$^3$/15 days) by further fastening the threaded portion provided between the inner bottom of the outer pot body and the outer bottom of the inner pot body, so that a small foliage plant was obtained.

EXAMPLES

Examples of the present invention will now be described in details. However, the following description is merely for illustrative purposes and is not intended to limit the invention without a particular reason.

Example 1

1. Manufacturing of Flower Pot
(1) Process (1)
The outer pot body of the flower pot of FIG. 1 was injection-molded by mixing a PCTA resin, Eastar AN014 (produced by Eastman Chemical Company), as a polyester resin using an injection molding apparatus That is, the outer pot body of the flower pot formed of a PCTA resin was manufactured by setting an injection temperature of 280° C. and an injection pressure of 500 kgf/cm$^2$ using the injection molding apparatus.

Similarly, using the injection molding apparatus, the inner pot body of the flower pot was injection-molded from a PCTA resin, Eastar AN014 (produced by Eastman Chemical Company), as a polyester resin.

That is, the inner pot body of the flower pot was manufactured by setting an injection temperature of 280° C. and an injection pressure of 500 kgf/cm$^2$ in the injection molding apparatus.

(2) Process (2)
Then, a small foliage plant was formed in the following procedure.

1) As illustrated in FIG. 2, an inner pot body 14 having a cylindrical stand portion having a height of 5 mm, a threaded portion having a guide member (fastened by about four turns), and a water access hole (opening area: 2 mm$^2$) was prepared in the vicinity of the bottom of the inner pot body formed of a PCTA resin with a volume of 75 mm$^3$.

2) Then, a nonwoven fabric member 20 formed of a circular polyethylene material having a thickness of 2 mm and a diameter of 55 mm and provided with a lateral protrusion having a length of 1 cm was housed in the bottom in the upper side of the inner pot body 14 as illustrated in FIGS. 3A and 3B.

3) Then, a porous material for hydroculture having an average particle diameter of 6 mm (product name: HydroBall produced by SHIBATA-ENGEI Co., Ltd.) was charged inside the inner pot body.

Figure 4C:
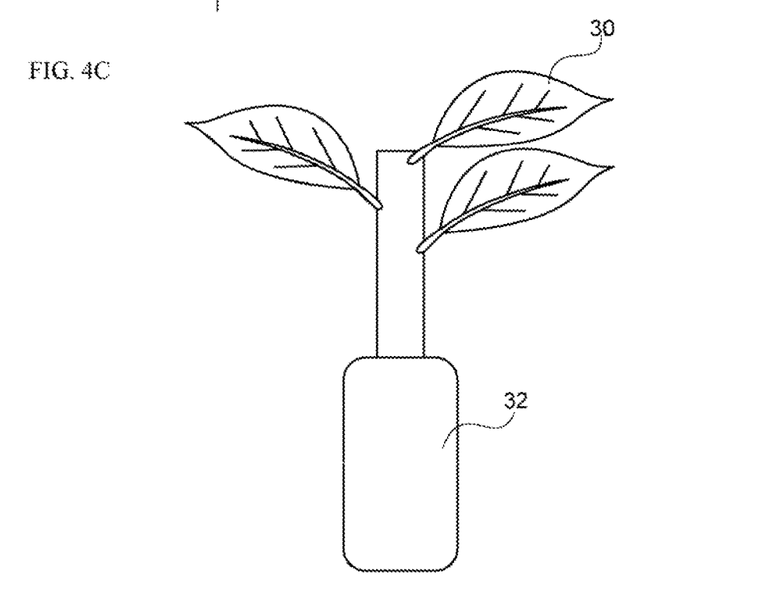
FIG. 4C is a diagram illustrating a planted tree (foliage plant) to be watered.

4) Then, as illustrated in FIG. 4C, a foliage plant (kapok tree) having a height of 10 cm and a sponge-like material wrapped around a root portion was transplanted into gaps of a plurality of the porous materials filled in the inner pot body.

5) Then, as illustrated in FIG. 1, an outer pot body formed of a PCTA resin with a volume of 120 mm$^3$ was prepared, and water was charged to 20 mm$^3$ with reference to the metric scale provided on the sidewall.

6) Then, the inner pot body transplanted with the foliage plant or the like was housed in the outer pot body charged with water.

7) Then, the height of the inner pot body inside the outer pot body was adjusted, and the sealing property of the sealing portion mounted with the elastic member (O-ring) formed of a olefin resin was adjusted by fastening the threaded portion provided between the inner bottom of the outer pot body and the outer bottom of the inner pot body (less than four turns out of maximum four turns, hereinafter, also referred to as Sealing Property 1), so that a small foliage plant was obtained.

8) Then, a supply rate was measured per twelve hours. If the supply rate is higher than a predetermined value, the sealing property was more precisely adjusted, and the supply rate was set to a predetermined range (for example, 20 mm$^3$/15 days) by further fastening or loosening the threaded portion provided between the inner bottom of the outer pot body and the outer bottom of the inner pot body, so that a small foliage plant (hereinafter, also referred to as Type 1) was obtained.

2. Evaluation of Flower Pot
(1) Water Supply Rate
Water was supplied to the obtained small foliage plant. Then, the water supply rate was evaluated on the basis of the following criteria from a change of the water amount of the water supply portion after fifteen days.

⊙(Very good): The water supply rate is 12 to 25 mm$^3$/15 days.

○(Good): The water supply rate is lower than 10 to 12 mm$^3$/15 days, or between 25 and 30 mm$^3$/15 days.

Δ(Fair): The water supply rate is lower than 8 to 10 mm$^3$/15 days, or between 30 and 45 mm$^3$/15 days.

X(Bad): The water supply rate is lower than 8 mm$^3$/15 days, or higher than 45 mm$^3$/15 days.

(2) Watering Property
Water was supplied to the obtained small foliage plant. Then, a watering property was evaluated on the basis of the following criteria from a state change of the watered foliage plant (leaf) after fifteen days.

⊙(Very good): The foliage plant (leaf) is in a very watery state.

○(Good): The foliage plant (leaf) is in a watery state.

Δ(Fair): The foliage plant (leaf) is slightly wilted.

X(Bad): The foliage plant (leaf) is slightly withered.

(3) Root Rot Property
Water of 20 mm$^3$ was supplied to the water supply portion every 15th day. Then, a root rot property was evaluated on the basis of the following criteria from occurrence of a state change or malodor of the foliage plant (root) after a month.

⊙(Very good): There is neither root rot nor malodor.

○(Good): There is no root rot, and nearly no malodor.

Δ(Fair): Root rot is generated partially, and malodor is generated slightly.

X(Bad): Root rot is generated apparently, and malodor is generated.

(4) Hydrolysis Resistance
Water of 20 mm$^3$ was supplied to the water supply portion every fifteenth day, and the flower pot was left in an outdoor state for four months. Then, the hydrolysis resistance of the flower pot was evaluated on the basis of the following criteria from a state change of the water supply portion.

⊙(Very good): The flower pot still maintains initial transparency or the like.

○(Good): The flower pot nearly maintains initial transparency or the like.

Δ(Fair): The initial transparency or the like is degraded, so that some whitening or cracks are observed in the flower pot.

X(Bad): The initial transparency or the like is significantly degraded, so that whitening or cracks are observed apparently.

Example 2

In Example 2, a small foliage plant including the flower pot was obtained in a similar way to Example 1, except that the threaded portion was fastened by three turns out of maximum four turns (hereinafter, also referred to as Sealing Property 2), and the root rot property or the like were evaluated. The result is shown in Table 1.

Example 3

In Example 3, a small foliage plant including the flower pot was obtained in a similar way to Example 1, except that the threaded portion was fastened by two turns out of maximum four turns (hereinafter, also referred to as Sealing Property 3), and the root rot property or the like were evaluated. The result is shown in Table 1.

Example 4

In Example 4, a small foliage plant including the flower pot was obtained in a similar way to Example 1, except that the threaded portion was fastened by a single turn out of maximum four turns (hereinafter, also referred to as Sealing Property 4), and the root rot property or the like were evaluated. The result is shown in Table 1.

Examples 5 to 8

In Examples 5 to 8, the root rot property or the like were evaluated in a similar way to Examples 1 to 4, except that the innermost pot, the inner pot body, the outer pot body, and the flower pot obtained by combining them as illustrated in FIGS. 5 and 6A to 6C (hereinafter, also referred to as Type 2) were employed.

However, in this flower pot, the sealing portion is provided between the inner pot body and the outer pot body, the male threaded portion is provided on the upper outer surface of the inner pot body, and the female threaded portion is provided on the upper inner surface of the outer pot body. If the outer pot body is fastened against the inner pot body by a half turn, the threaded portion is perfectly fastened, so that the sealing portion is perfectly sealed.

Therefore, in Example 5, a perfectly fastened state is obtained by rotating the outer pot body against the inner pot body by a half turn from a start position (½ turn, hereinafter, also referred to as Sealing Property 1').

In Example 6, a nearly perfectly fastened state is obtained by rotating the outer pot body against the inner pot body by a ⅖ turn from the start position (hereinafter, also referred to as Sealing Property 2').

In Example 7, a roughly fastened state is obtained by rotating the outer pot body against the inner pot body by a ⅓ turn from the start position (hereinafter, also referred to as Sealing Property 3').

In Example 8, a loosely fastened state is obtained by rotating the outer pot body against the inner pot body by a ¼ turn from the start position (hereinafter, also referred to as Sealing Property 4').

Each of the results is shown in Table 1.

Comparative Example 1

In Comparative Example 1, a small foliage plant including the flower pot was obtained using the flower pot of Type 1 in a similar way to Example 1, except that the threaded portion was fastened by zero turn out of maximum four turns, that is, in a non-fastened state (hereinafter, also referred to as Sealing Property 5), and the root rot property or the like were evaluated. The result is shown in Table 1.

Comparative Example 2

In Comparative Example 2, a small foliage plant including the flower pot was obtained using the flower pot of Type 2 in a similar way to Example 5, except that the outer pot body is not rotated against the inner pot body from the initial fastening position, that is, in a non-fastened state (hereinafter, also referred to as Sealing Property 5'), and the root rot property or the like were evaluated. The result is shown in Table 1.

Comparative Example 3

In Comparative Example 3, a small foliage plant including the flower pot was obtained in a similar way to Example 5, except that a flower pot of Type 1 obtained by injection molding using a typical polyester resin (PET 6286RG pulverized product, produced by KOHOKI INDUSTRY CO., LTD.) was used and the outer pot body is not rotated against the inner pot body from the initial fastening position, that is, in a non-fastened state (hereinafter, also referred to as Sealing Property 5'). Then, the root rot property or the like were evaluated. The result is shown in Table 1.

TABLE 1

|  | Flower pot | Sealing property | Evaluation 1 | Evaluation 2 | Evaluation 3 | Evaluation 4 |
| --- | --- | --- | --- | --- | --- | --- |
| Example 1 | Type 1 | 1 | ⊙ | ⊙ | ⊙ | ⊙ |
| Example 2 | Type 1 | 2 | ○ | ○ | ○ | ⊙ |
| Example 3 | Type 1 | 3 | ○ | ○ | Δ | ⊙ |
| Example 4 | Type 1 | 4 | Δ | ○ | Δ | ⊙ |
| Example 5 | Type 2 | 1' | ⊙ | ⊙ | ⊙ | ○ |
| Example 6 | Type 2 | 2' | ○ | ○ | ○ | ○ |
| Example 7 | Type 2 | 3' | ○ | ○ | ○ | ○ |
| Example 8 | Type 2 | 4' | Δ | ○ | Δ | ○ |

TABLE 1-continued

|  | Flower pot | Sealing property | Evaluation 1 | Evaluation 2 | Evaluation 3 | Evaluation 4 |
|---|---|---|---|---|---|---|
| Comparative Example 1 | Type 1 | 5 | X | X | X | ◎ |
| Comparative Example 2 | Type 2 | 5' | X | X | X | ○ |
| Comparative Example 3 | Type 1 | 5' | X | X | X | Δ |

Evaluation 1: supply rate
Evaluation 2: watering property
Evaluation 3: root rot property
Evaluation 4: hydrolysis resistance

INDUSTRIAL APPLICABILITY

Using the flower pot according to the invention, a predetermined sealing portion is configured depending on the size of the flower pot. Therefore, it is possible to control the water supply rate over a relatively long period of time such as fifteen days or longer even using a simple structure.

Therefore, since an amount of water desired by a planted tree can be supplied, it is possible to generate little root rot and reduce watering frequency within a predetermined period of time.

In addition, since the outer pot body or the inner pot body that forms a water supply portion is formed of a predetermined special polyester resin, it is possible to obtain an excellent hydrolysis resistance or transparency (including coloring transparency) compared to a typical polyester resin. In addition, it is possible to remarkably improve durability and visually observe the water amount remaining in the supply portion.

In the flower pot according to the invention, in the case of a relatively small flower pot having a circle-equivalent opening diameter (diameter) of 3 to 12 cm, it is possible to easily control the sealing property between the outer pot body and the inner pot body even using at least one vertical position changeable member (threaded portion and the like). Therefore, it can be said that the flower pot according to the invention is more preferable.

However, even in the case of a relatively middle or large flower pot having a circle-equivalent opening diameter (diameter) of 12 cm or larger, it is anticipated that the flower pot according to the invention can be preferably employed, for example, by providing a double sealing portion, providing a plurality of elastic members in a single sealing portion, or providing a plurality of vertical position changeable members for controlling the sealing property.

EXPLANATIONS OF LETTERS OR NUMERALS

10: flower pot (plant pot), 11: porous material (HydroBall) 12: outer pot body, 12a: flange, 12b: sidewall, 12b': upper end surface, 12c: bottom, 12d: part of vertical position, changeable member (male threaded portion), 12e: water supply metric scale, 12f: center, 12g: guide member, 13: vertical position changeable member, 14: inner pot body, 14a: folding portion, 14b: sidewall, 14c: bottom surface, 14d: part of vertical position changeable member (female threaded portion), 14e: stand portion, 14f: center, 14g: guide member, 14h: feeding hole, 15: water supply portion, 16: sealing portion, 16a: elastic member, 20: nonwoven fabric member, 20a: main body, 20b: protrusion, 30: foliage plant (planted tree), 32: protection member, 50: flower pot, 50a: innermost pot, 50a': slit, 52: outer pot body, 52a: flange, 52d: part of vertical position changeable member (male threaded portion), 53: vertical position changeable member (threaded portion), 54: inner pot body, 54a: folding portion, 54d: part of vertical position changeable member (female threaded portion), 55: water supply portion, 56: sealing portion, 56a: elastic member

The invention claimed is:

1. A flower pot comprising:
   an outer pot body;
   an inner pot body housed in the outer pot body with a gap as a water supply portion;
   a folding portion provided on an upper end surface of a sidewall of the inner pot body; and
   a sealing portion formed of an elastic member and provided between the folding portion and an upper end surface of a sidewall of the outer pot body,
   wherein water stored in the water supply portion is supplied to the inner pot body through a nonwoven fabric member,
   a planar shape of the nonwoven fabric member is a circular shape including a protruding portion, and a cross-sectional shape of the nonwoven fabric member is a planar member having the same thickness a through-hole is provided in a bottom of the inner pot body and the nonwoven fabric member is inserted inside the inner pot body, wherein the protruding portion reaches the gap at the water supply portion through the through-hole,
   an inner bottom surface of the outer pot body is provided with a first threaded portion and an outer bottom surface of the inner pot body is provided with a second threaded portion as a vertical position changeable member, and
   the inner bottom surface of the outer pot body and the outer bottom surface of the inner pot body are connected to each other with the first threaded portion and the second threaded portion.

2. The flower pot according to claim 1, wherein the folding portion has an O-ring as the elastic member.

3. The flower pot according to claim 1, wherein a flange is provided in the sidewall of the outer pot body.

4. The flower pot according to claim 1, wherein any one of the outer pot body or the inner pot body is formed of at least one of polycyclohexane dimethylene terephthalate, an alcohol-modified product of polycyclohexane dimethylene terephthalate, or a glycol-modified product of polycyclohexane dimethylene terephthalate as a main component.

5. The flower pot according to claim 1, wherein a water supply metric scale is provided on a sidewall of the outer pot body or a sidewall of the inner pot body.

6. The flower pot according to claim 1, wherein an innermost pot having a plurality of openings is provided inside the inner pot body, and
   a porous material is filled in the innermost pot.

* * * * *